United States Patent
Hong

(10) Patent No.: US 12,101,738 B2
(45) Date of Patent: Sep. 24, 2024

(54) PAGING RESPONSE METHOD AND DEVICE, PAGING METHOD AND DEVICE

(71) Applicant: BEIJING XIAOMI MOBILE SOFTWARE CO., LTD., Beijing (CN)

(72) Inventor: Wei Hong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 353 days.

(21) Appl. No.: 17/605,977

(22) PCT Filed: Apr. 25, 2019

(86) PCT No.: PCT/CN2019/084376
§ 371 (c)(1),
(2) Date: Oct. 22, 2021

(87) PCT Pub. No.: WO2020/215289
PCT Pub. Date: Oct. 29, 2020

(65) Prior Publication Data
US 2022/0201650 A1    Jun. 23, 2022

(51) Int. Cl.
*H04W 68/02* (2009.01)

(52) U.S. Cl.
CPC .................................. *H04W 68/02* (2013.01)

(58) Field of Classification Search
CPC ... H04W 68/02; H04W 68/005; H04W 68/00; H04W 88/06; H04W 76/20; H04M 2250/66; H04M 1/72454; H04M 1/72484; Y02D 30/70
See application file for complete search history.

(56) References Cited

U.S. PATENT DOCUMENTS

2008/0014941 A1    1/2008    Catovic et al.
2013/0303203 A1    11/2013    Wang et al.
(Continued)

FOREIGN PATENT DOCUMENTS

CN    103428673 A    12/2013
CN    105554884 A    5/2016
(Continued)

OTHER PUBLICATIONS

PCT/CN2019/084376 English translation of the International Search Report dated Dec. 31, 2019, 2 pages.
(Continued)

*Primary Examiner* — Kenneth T Lam
(74) *Attorney, Agent, or Firm* — Cozen O'Connor

(57) ABSTRACT

A paging response method, a paging method, an electronic device and a storage medium. The response method, for terminal configured to couple at least two operator networks, includes: determining information on a first priority for communicating with a first operator network in the at least two operator networks in response to a coupling state with the first operator network; acquiring information on a second priority for communication between a second operator network in the at least two operator networks and the terminal from a paging message in response to receiving the paging message from the second operator network; and determining to maintain the coupling state with the first operator network, or to decouple from the first operator network and to respond to the paging message of the second operator network, based on the information on the first priority and the information on the second priority.

19 Claims, 8 Drawing Sheets

(56) References Cited

U.S. PATENT DOCUMENTS

| | | | |
|---|---|---|---|
| 2016/0174188 A1* | 6/2016 | Kim | H04L 65/1045 |
| | | | 455/458 |
| 2017/0180951 A1* | 6/2017 | Lee | H04W 72/543 |
| 2017/0359800 A1* | 12/2017 | Cui | H04W 68/02 |
| 2018/0041953 A1 | 2/2018 | Lindoff et al. | |
| 2018/0160422 A1* | 6/2018 | Pathak | H04W 76/10 |
| 2018/0288691 A1* | 10/2018 | Chen | H04M 15/8061 |
| 2018/0368099 A1* | 12/2018 | Chen | H04W 48/18 |
| 2020/0028795 A1* | 1/2020 | Tiwary | H04L 47/6275 |
| 2020/0037380 A1* | 1/2020 | Qiu | H04W 68/005 |
| 2021/0127256 A1* | 4/2021 | Li | H04W 60/005 |
| 2022/0217675 A1* | 7/2022 | Chen | H04W 68/00 |

FOREIGN PATENT DOCUMENTS

| | | |
|---|---|---|
| CN | 107787042 A | 3/2018 |
| JP | 2016513934 A | 5/2016 |
| WO | WO 2018005419 A1 | 1/2018 |

OTHER PUBLICATIONS

Indian Patent Application No. 202147052811, Office Action dated Apr. 27, 2022, 5 pages.
European Patent Application No. 19926541.4, Search and Opinion dated Nov. 17, 2022, 12 pages.
Qualcomm Incorporated "Report of Offline #013 on additional MT cause in MSG3 and/or paging for voice" 3GPP TSG-RAN2 #103, R2-1813378, Aug. 2018, 7 pages.
Qualcomm Incorporated "Establishment Cause for Voice and Video" 3GPP TSG-RAN2 #103, R2-1811044, Aug. 2018, 3 pages.
Japanese Patent Application No. 2021-562884, Office Action dated Nov. 22, 2022, 5 pages.
Japanese Patent Application No. 2021-562884, English translation of Office Action dated Nov. 22, 2022, 4 pages.
Russian Patent Application No. 2021133837, Office Action dated Jul. 22, 2022, 11 pages.
Russian Patent Application No. 2021133837, English translation of Office Action dated Jul. 22, 2022, 10 pages.

* cited by examiner

PAGING RESPONSE METHOD AND DEVICE, PAGING METHOD AND DEVICE

CROSS-REFERENCE TO RELATED APPLICATION

This application is a national phase of International Application No. PCT/CN2019/084376, filed on Apr. 25, 2019, the entire contents of which are incorporated herein by reference.

TECHNICAL FIELD

The disclosure relates to the field of communication technologies, and more particularly, to a paging response method, a paging method, a paging response apparatus, a paging apparatus, an electronic device and a computer-readable storage medium.

BACKGROUND

For a multi-SIM (Subscriber Identification Module) mobile phone, such as a dual-SIM mobile phone, when one SIM accesses a network of an operator A and another SIM receives a paging message from a network of an operator B, it is preconfigured whether to respond to the paging message by a manufacturer when manufacturing the mobile phone, for example, it is preconfigured to always respond or to always not respond.

However, in real life, there can be a number of different reasons why the network of the operator B is paging a mobile phone. It is difficult to satisfy the different requirements under different situations of the operator network solely based on the factory configurations on whether to respond to a particular paging message.

SUMMARY

According to a first aspect of embodiments of the disclosure, a paging response method is provided. The method is applicable to a terminal. The terminal is configured to connect to at least two operator networks.

The method includes determining information indicating a first priority for communicating with a first operator network in the at least two operator networks in response to a connection state with the first operator network.

The method further includes acquiring information indicating a second priority for communication between a second operator network in the at least two operator networks and the terminal from a paging message in response to receiving the paging message from the second operator network.

The method also further includes determining to maintain the connection state with the first operator network, or to disconnect from the first operator network and to respond to the paging message of the second operator network, based on the information indicating the first priority and the information indicating the second priority.

According to a second aspect of embodiments of the disclosure, a paging method is provided. The method is applicable to an operator network.

The method includes generating a paging message based on information indicating a priority for communicating with a terminal.

The method further includes transmitting the paging message to the terminal, in which the paging message includes the information indicating the priority.

According to a third aspect of embodiments of the disclosure, an electronic device is provided.

The electronic device includes a processor.

The electronic device further includes a memory configured to store instructions executable by the processor.

The processor is configured to perform the paging response method as described in the above embodiments.

According to a fourth aspect of embodiments of the disclosure, an electronic device is provided.

The electronic device includes a processor.

The electronic device further includes a memory configured to store instructions executable by the processor.

The processor is configured to perform the paging method as described in the above embodiments.

According to a fifth aspect of embodiments of the disclosure, a computer-readable storage medium with computer programs stored thereon is provided. When the computer programs are executed by the processor, actions in the paging response method as described in the above embodiments are performed.

According to a sixth aspect of embodiments of the disclosure, a computer-readable storage medium with computer programs stored thereon is provided. When the computer programs are executed by the processor, actions in the paging method as described in the above embodiments are performed.

BRIEF DESCRIPTION OF THE DRAWINGS

In order to explain technical solutions in embodiments of the disclosure more clearly, the drawings described in the embodiments will be briefly introduced below. Obviously, the drawings described as below are only some embodiments of the disclosure. Those skilled in the art may obtain other drawings on the basis of these drawings without creative work.

DETAILED DESCRIPTION

The technical solutions in embodiments of the disclosure will be described clearly and completely in combination with the drawings in embodiments of the disclosure. It is obvious that the embodiments described are only part of embodiments in the disclosure, rather than all embodiments. On the basis of embodiments of the disclosure, all other embodiments obtained by those skilled in the art without creative work are within the protection scope of the disclosure.

Figure 1:
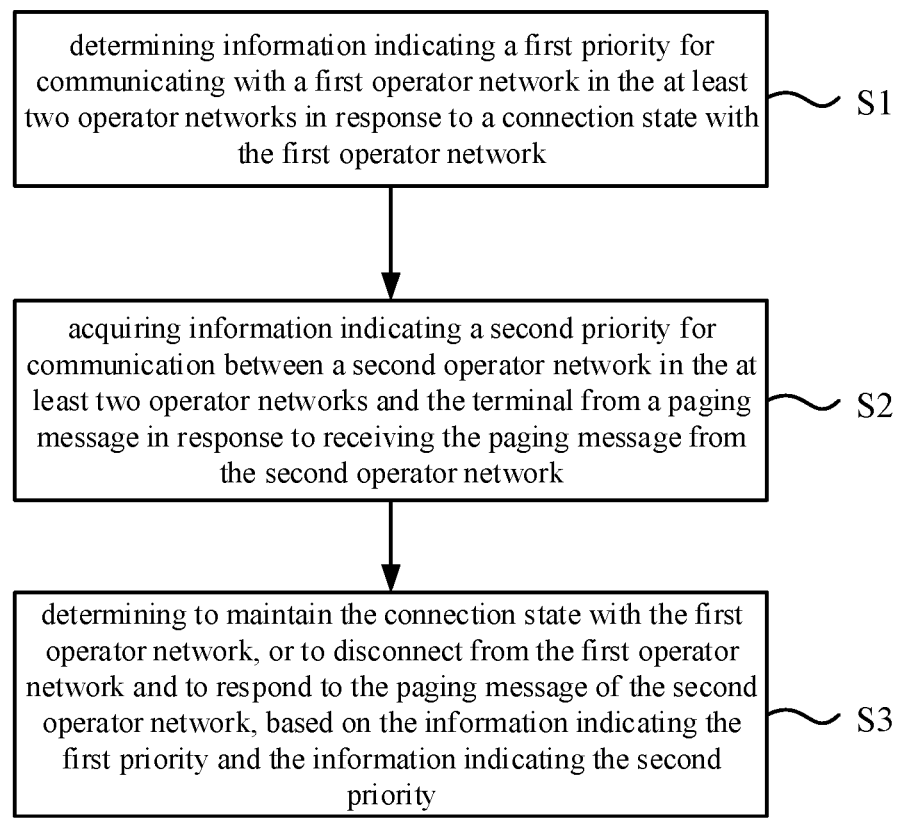
FIG. 1 is a flowchart illustrating a paging response method according to embodiments of the disclosure.

FIG. 1 is a flowchart illustrating a paging response method according to embodiments of the disclosure. The paging response method as illustrated in the embodiments of the disclosure may be applicable to a terminal. The terminal may communicate based on a multi-SIM single-standby (for example, dual-SIM single-standby) mode, or a multi-SIM multi-standby (for example, dual-SIM dual-standby) mode, or a multi-SIM multi-standby multi-pass (for example, dual-SIM dual-standby dual-pass) mode.

The terminal is configured to connect to at least two operator networks. For example, the terminal may be configured as user equipment for communicating with a base station in an operator network. The terminal may be configured with a plurality of subscriber identity modules (SIMs), such as universal subscriber identity modules (USIMs) in detail. The SIM 1 in the plurality of SIMs may be connected to a first operator network, and the SIM 2 in the plurality of SIMs may be connected to a second operator network. The first operator network and the second operator network are networks provided by different operators, for example, the first operator network may be a network of China Mobile, and the second operator network may be a network of China Unicom or China Telecom.

As illustrated in FIG. 1, the paging response method includes the following.

At block S1, information indicating a first priority for communicating with a first operator network in the at least two operator networks, is determined, in response to a connection state with the first operator network.

In some embodiments, when the terminal is in the connection state with the first operator network, for example, there is a radio resource control (RRC) link with the first operator network (for example, a base station of the first operator network), the information indicating the first priority for communicating with the first operator network may be determined, for example, ToS may be determined based on the service of communication, or QoS may be determined, or QCI may be determined, or the like.

At block S2, information indicating a second priority for communication between a second operator network in the at least two operator networks and the terminal, is acquired from a paging message (also referred to as a paging signaling) in response to receiving the paging message from the second operator network.

In some embodiments, when the second operator network has a service of requiring to paging the terminal, the information indicating the second priority for communicating with the terminal may be determined first, for example. ToS for communicating with the terminal may be determined, QoS for communicating with the terminal may also be determined, QCI may be further determined, and the like, and the paging message is further generated based on the information indicating the second priority for communicating with the terminal, so that the paging message carries the information indicating the second priority and may be transmitted to the terminal, for example, the paging message may be transmitted to the terminal from the base station in the second operator network, and the way of transmitting the paging message may be broadcasting.

In addition, what differs from the information indicating the first priority is that the information indicating the second priority may further include reasons of paging the terminal since the information indicating the second priority is included in the paging message. The reasons of paging the terminal include but are not limited to voice communication for the terminal, data communication for the terminal, and emergency communication for the terminal.

The terminal may acquire the information indicating the second priority for communication between the second operator network and the terminal from the paging message upon receiving the paging message.

At block S3, it is determined to maintain the connection state with the first operator network, or to disconnect from the first operator network and to respond to the paging message of the second operator network, based on the information indicating the first priority and the information indicating the second priority.

In some embodiments, since the information indicating the first priority and the information indicating the second priority represent priorities for communicating with operator networks, the user equipment may determine whether the priority for communicating with the first operator network is higher or the priority for communicating with the second operator network (responding to the paging message of the second operator network in detail) is higher, thereby determining to maintain the connection state with the first operator network or to disconnect from the first operator network and to respond to the paging message of the second operator network.

For example, by comparing the information indicating the first priority with the information indicating the second priority (for example, comparing a value of the information indicating the first priority with a value of the information indicating the second priority), it may be determined whether the priority for communicating with the first operator network is higher or the priority for communicating with the second operator network is higher. When the priority for communicating with the first operator network is higher, the connection state with the first operator network may be maintained; and when the priority for communicating with the second operator network is higher, the connection state with the first operator network may be disconnected, and the paging message of the second operator network is responded to.

According to embodiments of the disclosure, the terminal may determine whether the priority for communicating with the first operator network is higher or the priority for communicating with the second operator network is higher based on the information indicating the first priority and the information indicating the second priority, and the information indicating the first priority and the information indicating the second priority may be configured by operator networks based on actual requirements, for example, the information indicating the first priority is configured by the first operator network, and the information indicating the second priority is configured by the second operator network.

Compared with the situation that the terminal fixedly selects whether to respond to the paging message based on the factory configurations in the related art, the embodiments of the disclosure may enable the terminal to select to maintain the connection state with the first operator network, or to disconnect from the first operator network and to respond to the paging message of the second operator network, thereby satisfying actual requirements of the first operator network and the second operator network more easily, and further ensuring a communication effect of the terminal.

It should be noted that, the first operator network and the second operator network in the above embodiments may be interchanged. For example, the terminal receives a paging message of the first operator network when being in a connection state with the second operator network, the second operator network may be taken as the first operator network in the above embodiments, and the first operator network may be taken as the second operator network in the above embodiments.

Optionally, the information indicating the first priority includes at least one of:
  type of service (ToS), quality of service (Qos), and quality of service class identifier (QCI); and/or
  the information indicating the second priority includes at least one of:
  ToS, QOS, QCI, and reason of paging the terminal.

In some embodiments, the information indicating the first priority for communicating with the first operator network, determined by the terminal, and the information indicating the second priority in the paging message transmitted by the second operator network, may be different types, for example, the information indicating the first priority is ToS, and the information indicating the second priority is QOS; and may be the same type, for example, the information indicating the first priority and the information indicating the second priority both are QoS.

Figure 2:
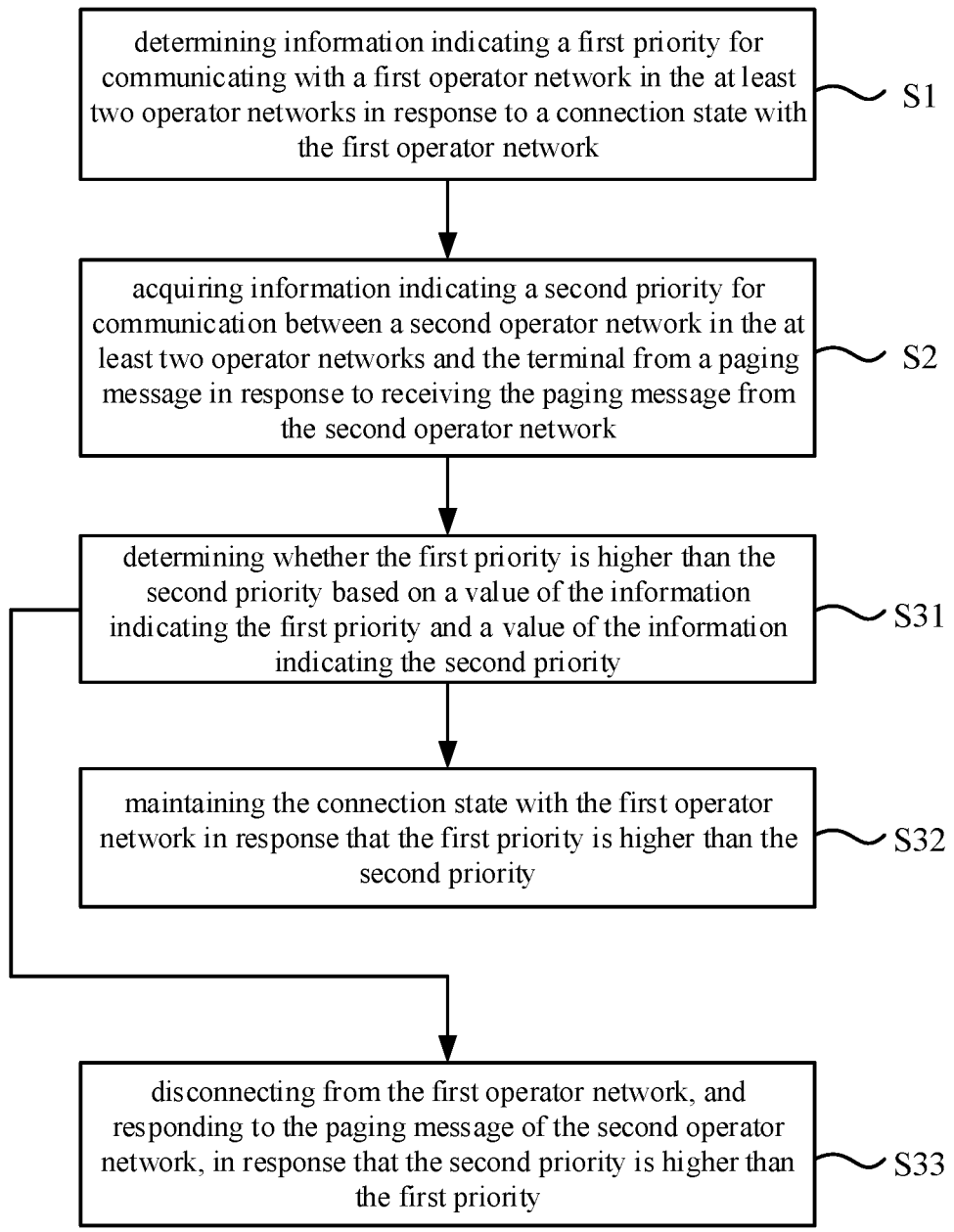
FIG. 2 is a flowchart illustrating another paging response method according to embodiments of the disclosure.

FIG. 2 is a flowchart illustrating another paging response method according to embodiments of the disclosure. As illustrated in FIG. 2, determining to maintain the connection state with the first operator network, or to disconnect from the first operator network and to respond to the paging message of the second operator network, based on the information indicating the first priority and the information indicating the second priority, includes the following.

At block S31, it is determined whether the first priority is higher than the second priority based on a value of the information indicating the first priority and a value of the information indicating the second priority.

At block S32, the connection state with the first operator network is maintained in response that the first priority is higher than the second priority.

At block S33, it disconnects from the first operator network, and responds to the paging message of the second operator network, in response that the second priority is higher than the first priority.

In some embodiments, it may be determined whether the first priority is higher than the second priority based on the value of the information indicating the first priority and the value of the information indicating the second priority.

Since the information indicating the priority may include a plurality of types, and the information of some types of priorities is a numerical value, such as QCI, the information of the priorities may be directly compared with each other.

For example, the information indicating the first priority and the information indicating the second priority are QCIs, in which the information indicating the first priority is 1 and the information indicating the second priority is 8. Therefore, the bearer (also understood as service) type of communication between the first operator network and the terminal may be determined as a guaranteed bit rate (GBR), i.e. the required bit rate "permanently" and constantly allocated by a network), and the bearer type of communication between the first operator network and the terminal is a NON-GBR (referring to the bearer requirement of requiring to reduce the rate in case of network congestion). It is more necessary to ensure the stability of communication between the first operator network and the terminal and to relatively weaken the stability of communication between the second operator network and the terminal, thereby determining that the first priority is higher than the second priority, and the connection state with the first operator network may be maintained.

When the information of some types of priorities is not a numerical value, such as QoS and ToS, values of the information of the priorities may be determined first, and then compared with each other.

For example, when the information indicating the first priority and the information indicating the second priority are both QoS. QoS is not the numerical value, and QoS may include one or more indicators, such as availability, throughput, latency, latency variation, packet loss. Therefore, the same type of indicator in the information indicating the priority may be compared, for example, the packet loss in the information indicating the first priority and the packet loss in the information indicating the second priority may be compared. When the packet loss in the information indicating the first priority is less than the packet loss in the information indicating the second priority, it may be determined that the quality of communication between the first operator network and the terminal is relatively good, and the quality of communication between the second operator network and the terminal is relatively good, thereby determining that the first priority is higher than the second priority. Therefore, the connection state with the first operator network may be maintained to enable the terminal to maintain a network communication with a relatively good communication quality.

For example, when the information indicating the first priority and the information indicating the second priority are both ToS. ToS itself is not the numerical value, and the latency allowed by ToS may be compared. For example, when the latency allowed by the information indicating the first priority is relatively low, and the latency allowed by the information indicating the second priority is relatively high, it may be determined the latency allowed by the service of communication between the first operator network and the terminal is relatively low, and the latency allowed by the service of communication between the second operator network and the terminal is relatively high, and it may be further determined that the first priority is higher than the second priority, and further the connection state with the first operator network may be maintained to enable the terminal to communicate with the first operator network in time, thereby satisfying the requirements of the service of communication between the first operator network and the terminal for latency.

Figure 3:
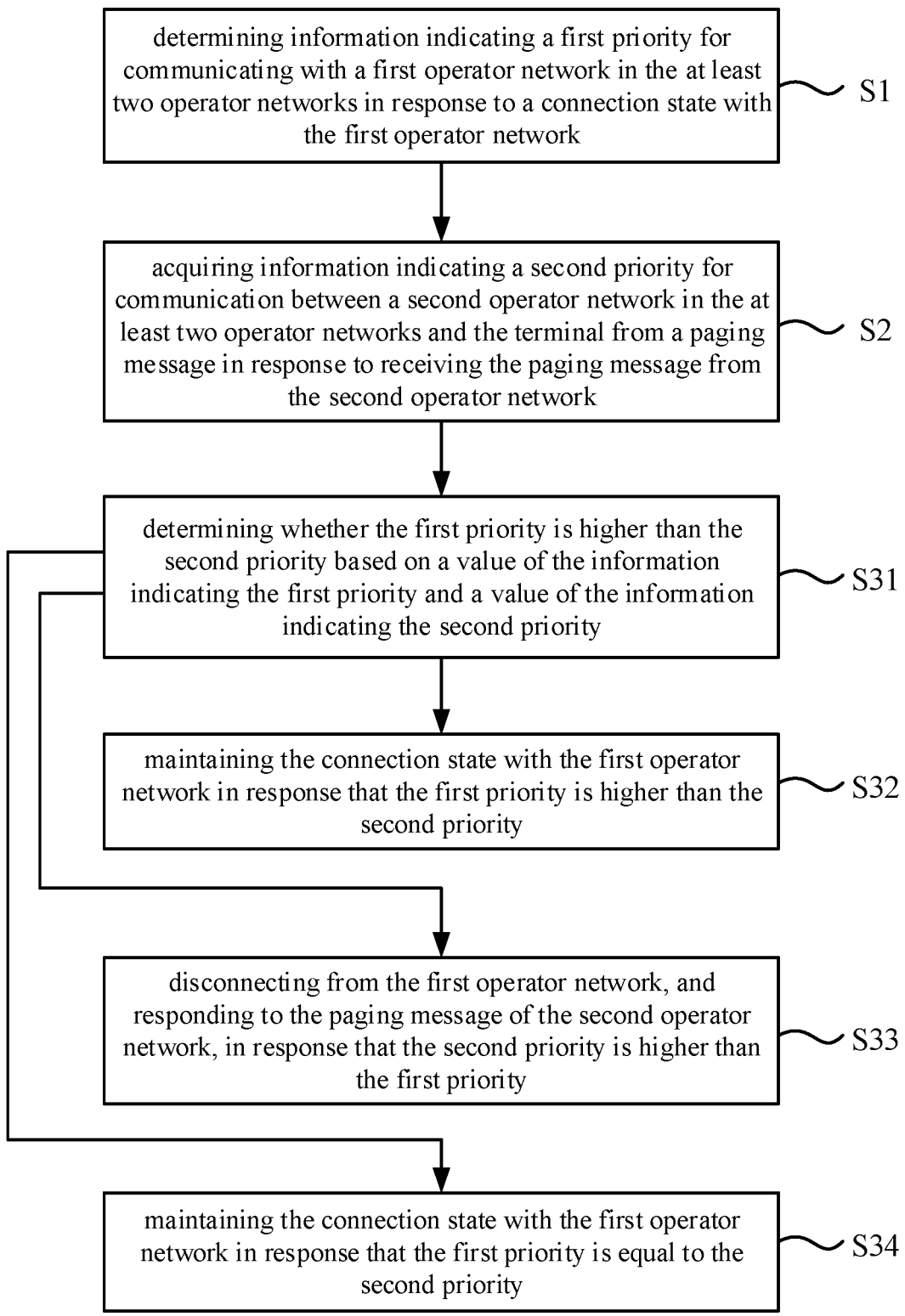
FIG. 3 is a flowchart illustrating still another paging response method according to embodiments of the disclosure.

FIG. 3 is a flowchart illustrating still another paging response method according to embodiments of the disclosure. As illustrated in FIG. 3, determining to maintain the connection state with the first operator network, or to disconnect from the first operator network and to respond to the paging message of the second operator network, based on the information indicating the first priority and the information indicating the second priority, includes the following.

At block S34, the connection state with the first operator network is maintained in response that the first priority is equal to the second priority.

In some embodiments, when the first priority is equal to the second priority, for example, the information indicating the first priority and the information indicating the second priority are QCIs, and two QCIs are the same, or the information indicating the first priority and the information indicating the second priority are QoS, and the packet loss of the information indicating the first priority is same with the packet loss of the information indicating the second priority, or the information indicating the first priority and the information indicating the second priority are ToS, and the latency allowed by the information indicating the second priority is same with the latency allowed by the information indicating the second priority, it may not be accurately differentiated whether the experience of the terminal maintaining the connection state with the first operator network is better or the experience of disconnecting from the first operator network and responding to the paging message of the second operator network is better. Since the terminal maintains the connection state with the first operator network, the connection state with the first operator network may be maintained to reduce the consumption of resources of the terminal.

Figure 4A:
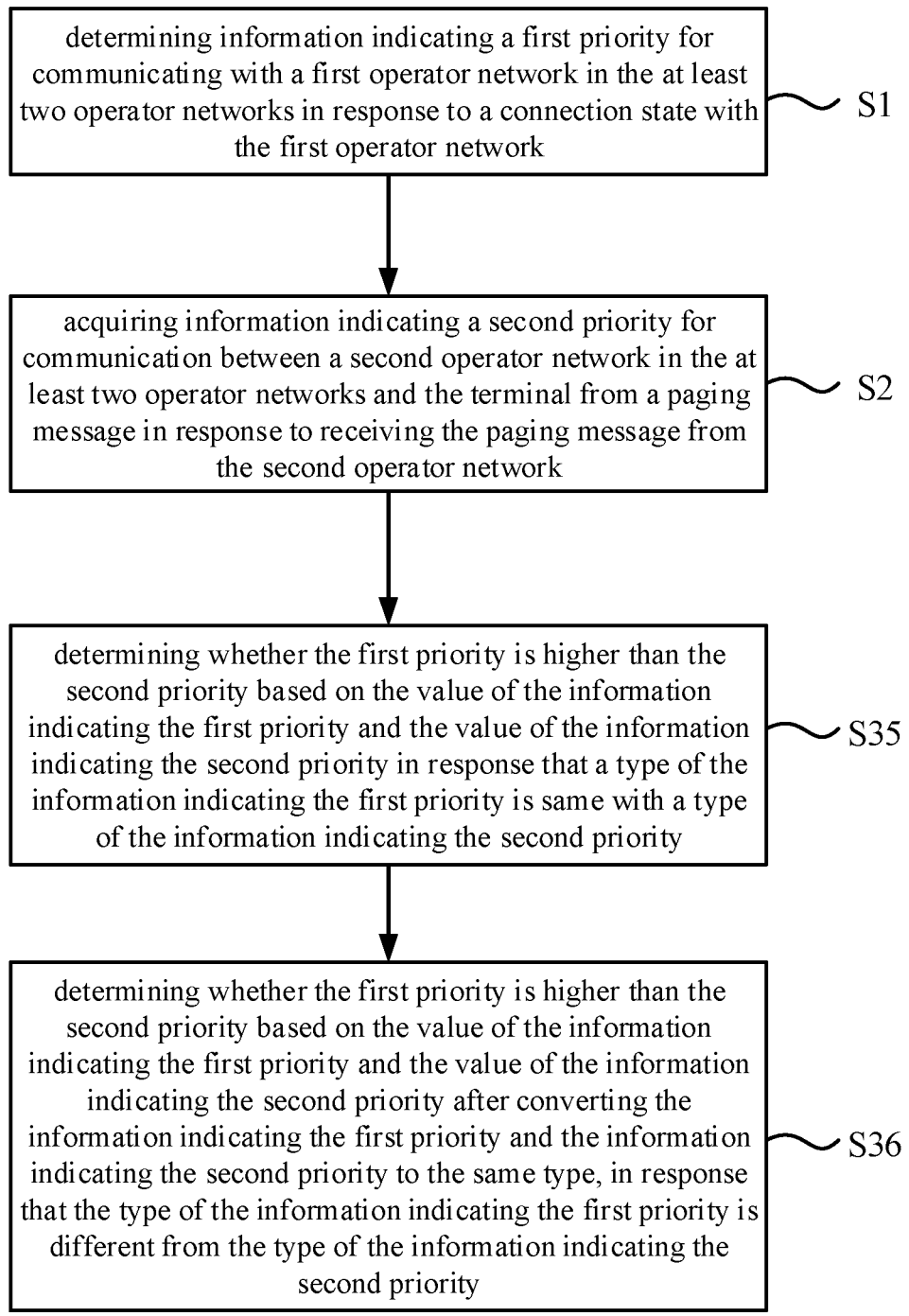
FIG. 4A is a flowchart illustrating still another paging response method according to embodiments of the disclosure.

FIG. 4A is a flowchart illustrating still another paging response method according to embodiments of the disclosure. As illustrated in FIG. 4A, determining whether the first priority is higher than the second priority based on the value of the information indicating the first priority and the value of the information indicating the second priority includes the following.

At block S35, it is determined whether the first priority is higher than the second priority based on the value of the information indicating the first priority and the value of the information indicating the second priority in response that a type of the information indicating the first priority is same with a type of the information indicating the second priority.

At block S36, it is determined whether the first priority is higher than the second priority based on the value of the information indicating the first priority and the value of the information indicating the second priority after converting the information indicating the first priority and the information indicating the second priority to the same type, in response that the type of the information indicating the first priority is different from the type of the information indicating the second priority.

In some embodiments, since the information indicating the priority may include a plurality of types, and different types of information indicating the priority have different meanings, when different types of information indicating the priority are directly compared, it is difficult to accurately determine whether the first priority is higher than the second priority.

Therefore, in some embodiments, for the same type of the information indicating the first priority and the information indicating the second priority, it may be determined whether the first priority is higher than the second priority based on the value of the information indicating the first priority and the value of the information indicating the second priority. For different types of information of priorities, after the information indicating the first priority and the information indicating the second priority are converted to the same type, it may be determined whether the first priority is higher than the second priority based on the value of the information indicating the first priority and the value of the information indicating the second priority.

For example, when the information indicating the first priority and the information indicating the second priority are QCIs, sizes of two QCIs may be directly compared.

For example, when the information indicating the first priority belongs to a first type such as ToS, and the information indicating the second priority belongs to a second type such as QCI, after ToS is converted to QCI, sizes of two QCIs are compared, in which a corresponding relationship table between the first type of information indicating the priority and the second type of information indicating the priority may be established in advance. The first type of information indicating the priority may be converted to the second type of information indicating the priority based on the corresponding relationship. The same type of information of priorities may be compared to accurately determine whether the first priority is higher than the second priority.

Figure 4B:
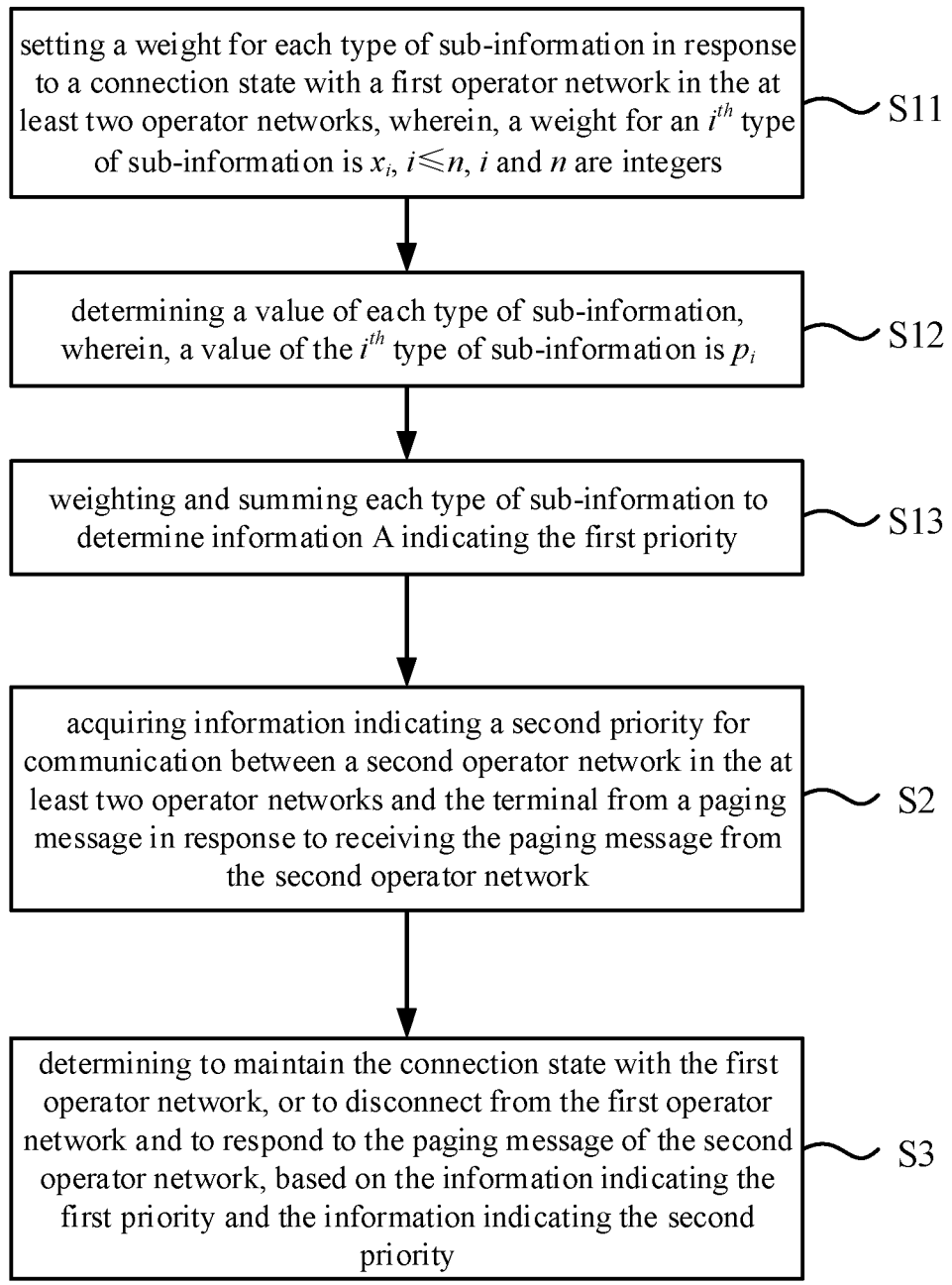
FIG. 4B is a flowchart illustrating still another paging response method according to embodiments of the disclosure.

FIG. 4B is a flowchart illustrating still another paging response method according to embodiments of the disclosure. As illustrated in FIG. 4B, the information indicating the first priority includes a plurality of types of sub-information, and determining the information indicating the first priority for communicating with the first operator network includes the following.

At block S11, a weight for each type of sub-information is set, in which a weight for an $i^{th}$ type of sub-information is $x_i$, i≤n, i and n are integers.

At block S12, a value of each type of sub-information is determined, in which a value of the $i^{th}$ type of sub-information is $p_i$. For example, when the type of sub-information is ToS, the latency allowed by ToS may be taken as a value of the type of sub-information; when the type of sub-information is QoS, a certain indicator in QoS (such as availability, throughput, latency, latency variation, packet loss) may be taken as a value of the type of sub-information; and when the type of sub-information is QCI, QCI may be taken as a value of the type of sub-information.

At block S13, each type of sub-information is weighted and summed to determine information A indicating the first priority:

$$A = \sum_{i=1}^{i=n} x_i p_i.$$

In some embodiments, when the information indicating the first priority includes a plurality of types of sub-information, each type of sub-information is weighted and summed to determine the information indicating the first priority, thereby comprehensively considering the influence of each type of sub-information indicating the priority of communication between the terminal and the first operator network to determine the first priority more accurately.

In addition to weighting and summing the plurality of types of sub-information in the above embodiments, the manner of determining the information indicating the first priority based on the plurality of types of sub-information may further include averaging the plurality of types of sub-information and extracting a root of sum of squares of the plurality of types of sub-information.

Taking weighting and summing the plurality of types of sub-information for an example, for n types of sub-information, the weight of the $i^{th}$ type of sub-information may be $x_i$, and the information $$A = \sum_{i=1}^{i=n} x_i p_i$$

on the first priority is calculated by weighting and summing the first type of sub-information $p_i$ to the $n^{th}$ type of sub-information $p_n$.

It should be noted that, the weight of each type of sub-information may be set based on the requirement. For example, the weight of a certain type of sub-information may be set to 0. Therefore, when the weights of (n−1) types of sub-information are 0, the information indicating the first priority is equal to the product of the value of one type of sub-information and the corresponding weight.

Figure 4C:
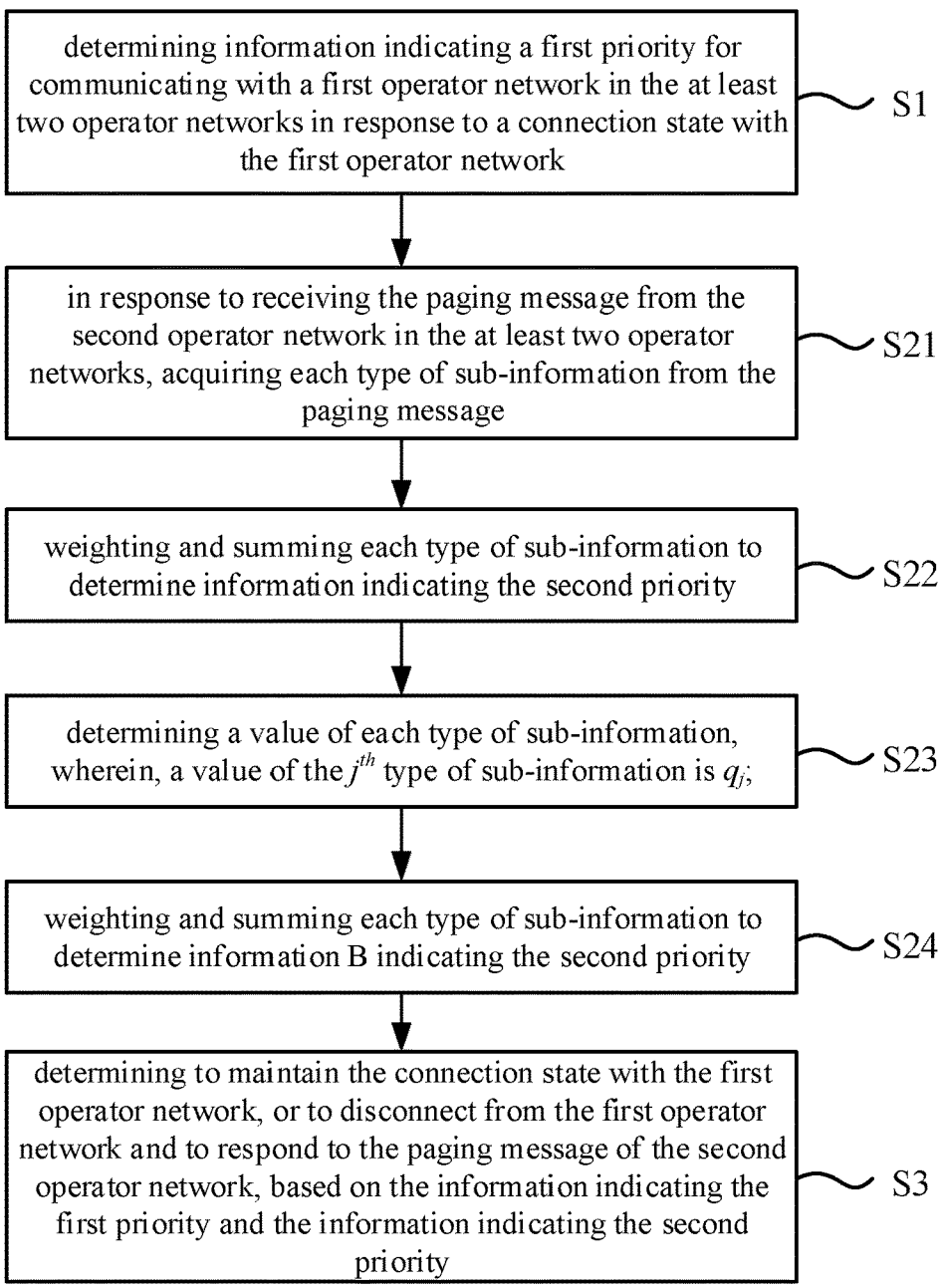
FIG. 4C is a flowchart illustrating still another paging response method according to embodiments of the disclosure.

FIG. 4C is a flowchart illustrating still another paging response method according to embodiments of the disclosure. As illustrated in FIG. 4C, the information indicating the second priority includes a plurality of types of sub-information, and acquiring the information indicating the second priority for communication between the second operator network and the terminal from the paging message includes the following.

At block S21, each type of sub-information is acquired from the paging message.

At block S22, a weight for each type of sub-information is set, in which a weight for a $j^{th}$ type of sub-information is $y_j$, j≤m, j and m are integers. For example, when the type of sub-information is ToS, the latency allowed by ToS may be taken as a value of the type of sub-information; when the type of sub-information is QoS, a certain indicator in QoS (such as availability, throughput, latency, latency variation, packet loss) may be taken as a value of the type of sub-information; and when the type of sub-information is QCI, QCI may be taken as a value of the type of sub-information.

At block S23, a value of each type of sub-information is determined, in which, a value of the $j^{th}$ type of sub-information is $q_j$.

At block S24, each type of sub-information is weighted and summed to determine information B indicating the second priority:

$$B = \sum_{j=1}^{j=m} y_j q_j.$$

In some embodiments, when the information indicating the second priority includes a plurality of types of sub-information, the information indicating the second priority may be determined based on the plurality of types of sub-information, thereby comprehensively considering the influence of each type of sub-information indicating the priority of communication between the terminal and the second operator network to determine the second priority more accurately.

In addition to weighting and summing the plurality of types of sub-information in the above embodiments, the manner of determining the information indicating the second priority based on the plurality of types of sub-information may further include averaging the plurality of types of sub-information and extracting a root of sum of squares of the plurality of types of sub-information.

Taking weighting and summing the plurality of types of sub-information for an example, for m types of sub-information, the weight of the $j^{th}$ type of sub-information may be $y_j$, and the information $$B = \sum_{j=1}^{j=m} y_j q_j$$

on the first priority is calculated by weighting and summing the first type of sub-information $q_i$ to the $m^{th}$ type of sub-information $q_m$.

It should be noted that, the weight of each type of sub-information may be set based on the requirement. For example, the weight of a certain type of sub-information may be set 0. Therefore, when the weights of (m−1) types of sub-information are 0, the information indicating the second priority is equal to the product of the value of one type of sub-information and the corresponding weight.

Figure 5:
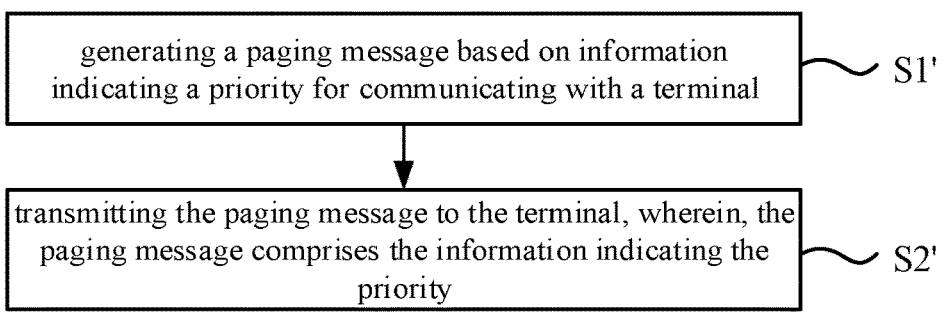
FIG. 5 is a flowchart illustrating a paging method according to embodiments of the disclosure.

FIG. 5 is a flowchart illustrating a paging method according to embodiments of the disclosure. The paging method as illustrated in embodiments of the disclosure may be applicable to an operator network, which may be referred to as a second operator network for the purpose of differentiation, for example, may be the second operator network in embodiments of the any above paging response methods.

As illustrated in FIG. 5, the paging method includes the following.

At block S1', a paging message is generated based on information indicating a priority for communicating with a terminal.

At block S2', the paging message is transmitted to the terminal, in which the paging message includes information indicating the priority.

In some embodiments, when the operator network has a service of requiring to paging the terminal, the information indicating the priority for communicating with the terminal may be determined first, for example, ToS for communicating with the terminal may be determined, QoS for communicating with the terminal may also be determined, QCI may be further determined and the like, and the paging message is further generated based on the information indicating the priority for communicating with the terminal, so that the paging message carries the information indicating the priority and may be transmitted to the terminal, for example, the paging message may be transmitted to the terminal from the base station in the operator network, and the way of transmitting the paging message may be broadcasting.

When the terminal is in a connection state with the first operator network, the information indicating the first priority for communicating with the first operator network may be determined, and the information indicating the second priority for communicating with the second operator network may be acquired from the paging message.

The terminal may determine whether the priority for communicating with the first operator network is higher or the priority for communicating with the second operator network is higher based on the information indicating the first priority and the information indicating the second priority, and the information indicating the first priority and the information indicating the second priority may be configured by operator networks based on the actual requirements. Compared with the situation that the terminal fixedly selects whether to respond to the paging message based on the factory configurations in the related art, the embodiments of the disclosure may enable the terminal to select to maintain the connection state with the first operator network, or to disconnect from the first operator network and to respond to the paging message of the second operator network, thereby satisfying actual requirements of the first operator network and the second operator network more easily, and further ensuring a communication effect of the terminal.

Optionally, the information indicating the priority includes at least one of:

ToS, QoS, QCI, and reason of paging the terminal.

The disclosure further provides embodiments of a paging response apparatus and a paging apparatus corresponding to the above embodiments of the paging response method and the paging method.

Figure 6:
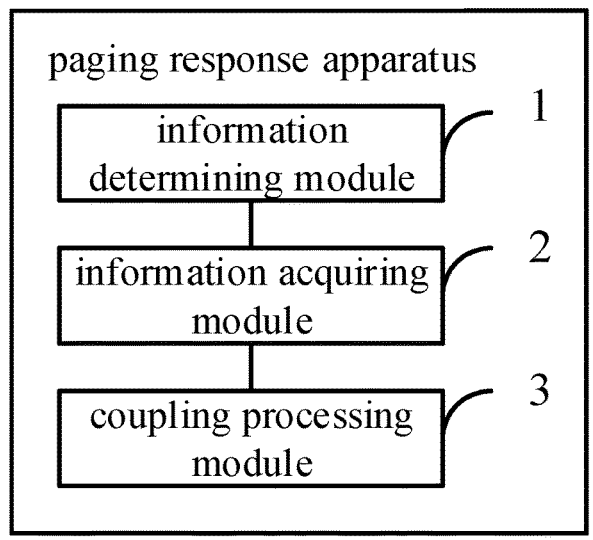
FIG. 6 is a block diagram illustrating a paging response apparatus according to embodiments of the disclosure.

FIG. 6 is a block diagram illustrating a paging response apparatus according to embodiments of the disclosure. The paging response apparatus as illustrated in the embodiments of the disclosure may be applicable to a terminal. The terminal may communicate based on a multi-SIM single-standby (for example, dual-SIM single-standby) mode, or a multi-SIM multi-standby (for example, dual-SIM dual-standby) mode, or a multi-SIM multi-standby multi-pass (for example, dual-SIM dual-standby dual-pass) mode.

The terminal is configured to connect to at least two operator networks. For example, the terminal may be configured as user equipment for communicating with a base station in an operator network. The terminal may be configured with a plurality of SIMs, such as USIMs in detail. The SIM 1 in the plurality of SIMs may be connected to a first operator network, and the SIM 2 in the plurality of SIMs may be connected to a second operator network. The first operator network and the second operator network are networks provided by different operators, for example, the first operator network may be a network of China Mobile, and the second operator network may be a network of China Unicom or China Telecom.

As illustrated in FIG. 6, the paging response apparatus includes an information determining module 1, an information acquiring module 2 and a coupling processing module 3.

The information determining module 1 is configured to determine information indicating a first priority for communicating with a first operator network in the at least two operator networks in response to a connection state with the first operator network.

The information acquiring module 2 is configured to acquire information indicating a second priority for communication between a second operator network in the at least two operator networks and the terminal from a paging message in response to receiving the paging message from the second operator network.

The coupling processing module 3 is configured to determine to maintain the connection state with the first operator network, or to disconnect from the first operator network and to respond to the paging message of the second operator network, based on the information indicating the first priority and the information indicating the second priority.

Optionally, the information indicating the first priority includes at least one of:

type of service (ToS), quality of service (QOS), and quality of service class identifier (QCI); and/or
the information indicating the second priority includes at least one of:

ToS, QoS, QCI, and reason of paging the terminal.

Figure 7:
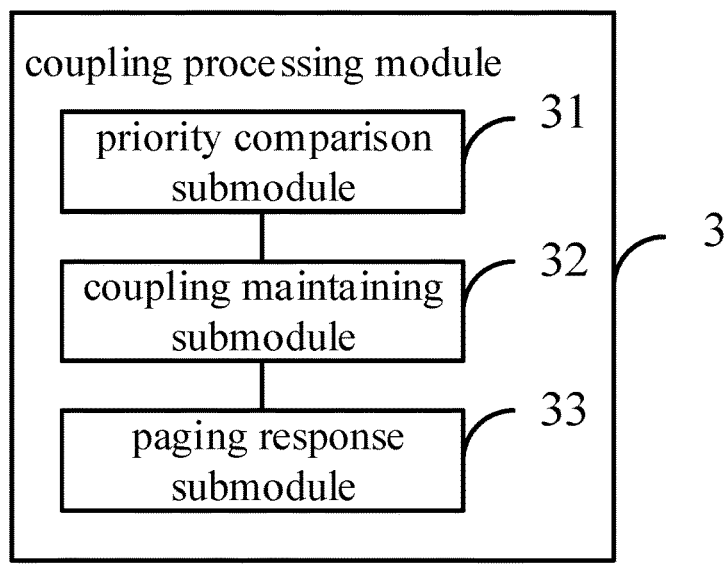
FIG. 7 is a block diagram illustrating a connection processing module according to embodiments of the disclosure.

FIG. 7 is a block diagram illustrating a coupling processing module according to embodiments of the disclosure. As illustrated in FIG. 7, the coupling processing module 3 further includes a priority comparison submodule 31, a coupling maintaining submodule 32 and a paging response submodule 33.

The priority comparison submodule 31 is configured to determine whether the first priority is higher than the second priority based on a value of the information indicating the first priority and a value of the information indicating the second priority.

The coupling maintaining submodule 32 is configured to maintain the connection state with the first operator network in response that the first priority is higher than the second priority.

The paging response submodule 33 is configured to disconnect from the first operator network, and responding to the paging message of the second operator network, in response that the second priority is higher than the first priority.

Optionally, the connection maintaining submodule is further configured to maintain the connection state with the first operator network in response that the first priority is equal to the second priority.

Optionally, the priority comparison submodule is further configured as follows.

The priority comparison submodule is further configured to determine whether the first priority is higher than the second priority based on the value of the information indicating the first priority and the value of the information indicating the second priority in response that a type of the information indicating the first priority is same with a type of the information indicating the second priority.

The priority comparison submodule is further configured to determine whether the first priority is higher than the second priority based on the value of the information indicating the first priority and the value of the information indicating the second priority after converting the information indicating the first priority and the information indicating the second priority to the same type, in response that the type of the information indicating the first priority is different from the type of the information indicating the second priority.

Optionally, the information indicating the first priority comprises m types of sub-information, and the information determining module 1 includes a first weight setting submodule 11, a first value determining submodule 12, and a first computing submodule 13.

The first weight setting submodule 11 is configured to set a weight for each type of sub-information, wherein, a weight for an $i^{th}$ type of sub-information is $x_i$, i≤n, i and n are integers.

The first value determining submodule 12 is configured to determine a value of each type of sub-information, wherein, a value of the $i^{th}$ type of sub-information is $p_i$.

The first computing submodule 13 is configured to weight and sum each type of sub-information to determine information A indicating the first priority:

$$A = \sum_{i=1}^{i=n} x_i p_i.$$

Optionally, the information indicating the second priority comprises m types of sub-information, and the information acquiring module 2 includes an information acquiring submodule 21, a second weight setting submodule 22, a second value determining submodule 23 and a second computing submodule 24.

The information acquiring submodule 21 is configured to acquire each type of sub-information from the paging message.

The second weight setting submodule 22 is configured to set a weight for each type of sub-information, wherein, a weight for a $j^{th}$ type of sub-information is $y_j$, $j \leq m$, j and m are integers.

The second value determining submodule 23 is configured to determine a value of each type of sub-information, wherein, a value of the $j^{th}$ type of sub-information is $q_j$.

The second computing submodule 24 is configured to weight and sum each type of sub-information to determine information B indicating the second priority:

$$B = \sum_{j=1}^{j=m} y_j q_j.$$

Figure 8:
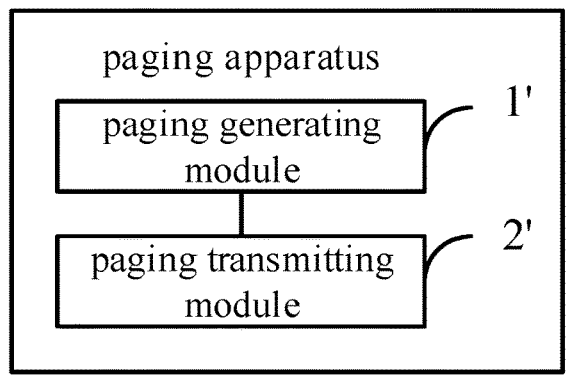
FIG. 8 is a block diagram illustrating a paging apparatus according to embodiments of the disclosure.

FIG. 8 is a block diagram illustrating a paging apparatus according to embodiments of the disclosure. The paging apparatus as illustrated in embodiments of the disclosure may be applicable to an operator network, for example, the second operator network in embodiments of the any above paging response apparatuses.

As illustrated in FIG. 8, the paging apparatus includes a paging generating module 1' and a paging transmitting module 2'.

The paging generating module 1' is configured to generate a paging message based on information indicating a priority for communicating with a terminal.

The paging transmitting module 2' is configured to transmit the paging message to the terminal, in which, the paging message includes the information indicating the priority.

Optionally, the information indicating the priority includes at least one of:

ToS, QoS, QCI, and reason of paging the terminal.

Regarding the apparatuses in the foregoing embodiments, the specific manner in which each module performs operations has been described in detail in the embodiments of the related methods, and will not be elaborated herein.

With respect to the apparatus embodiments, since they basically correspond to the method embodiments, relevant parts of the apparatus embodiments may refer to parts of the description of the method embodiments. The apparatus embodiments described above are merely illustrative. The units described above as separate components may or may not be physically separated, and the components displayed as units may or may not be physical units, that is, they may be located in one place or distributed to multiple network units. Some or all of the modules may be selected based on actual needs to achieve the objectives of the solutions of the disclosure. Those of ordinary skill in the art may understand and implement it without creative work.

According to embodiments of the disclosure, an electronic device is further provided.

The electronic device includes a processor.

The electronic device further includes a memory configured to store instructions executable by the processor.

The processor is configured to perform the paging response method as described in the above any embodiment.

According to embodiments of the disclosure, an electronic device is further provided.

The electronic device includes a processor.

The electronic device further includes a memory configured to store instructions executable by the processor.

The processor is configured to perform the paging method as described in the above any embodiment.

According to embodiments of the disclosure, a computer-readable storage medium with computer programs stored thereon is provided. When the computer programs are executed by the processor, actions in the paging response method as described in the above any embodiment are performed.

According to embodiments of the disclosure, a computer-readable storage medium with computer programs stored thereon is provided. When the computer programs are executed by the processor, actions in the paging method as described in the above any embodiment are performed.

Figure 9:
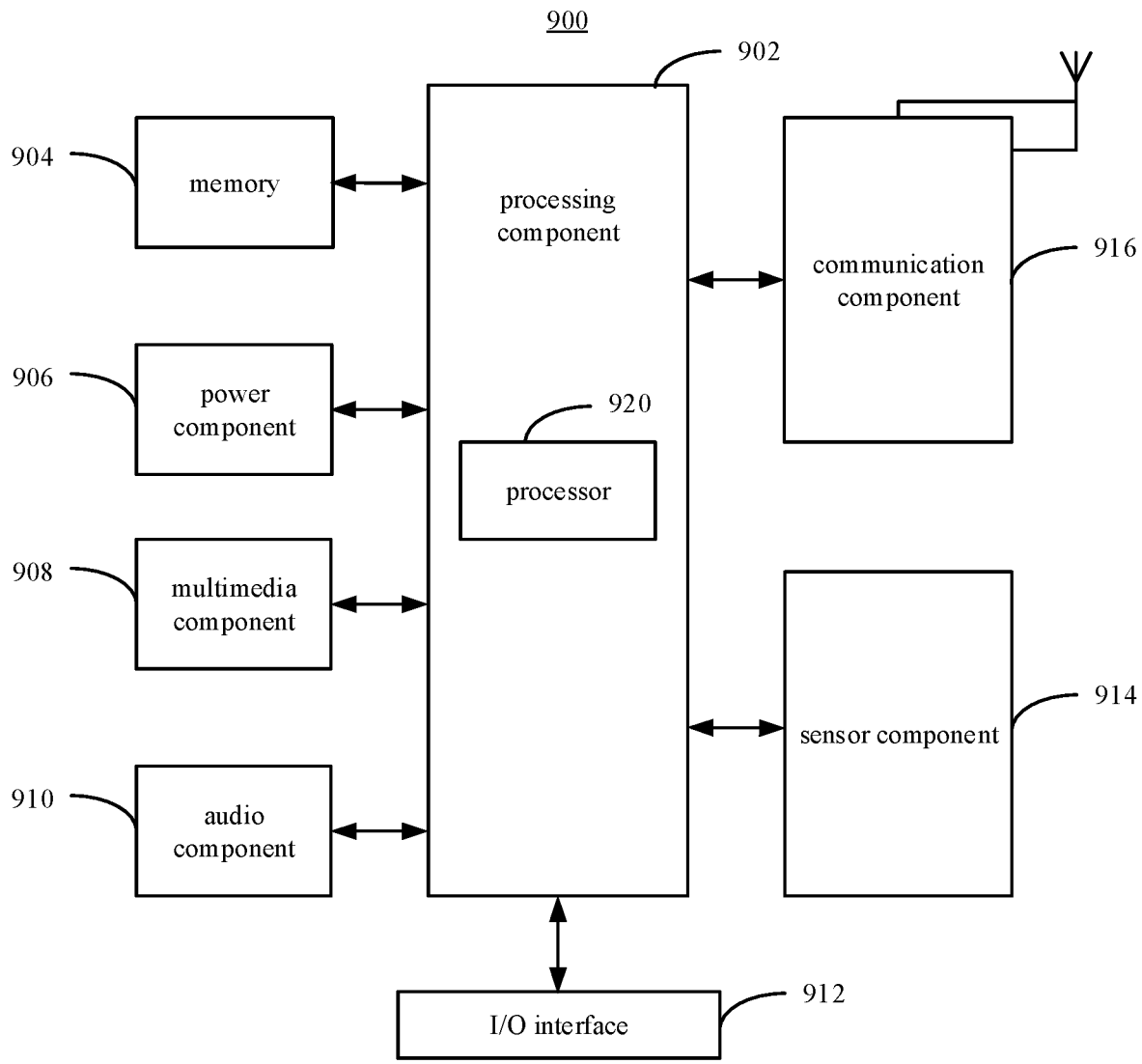
FIG. 9 is a block diagram illustrating a paging response device according to embodiments of the disclosure.

FIG. 9 is a block diagram illustrating a paging response device according to embodiments of the disclosure. For example, the device 900 may be a mobile phone, a computer, a digital broadcast terminal, a messaging device, a game console, a tablet device, medical equipment, fitness equipment, a personal digital assistant, etc.

Referring to FIG. 9, the device 900 may include one or more components: a processing component 902, a memory 904, a power component 906, a multimedia component 908, an audio component 910, an input/output (I/O) interface 912, a sensor component 914, and a communication component 916.

The processing component 902 typically controls overall operations of the device 900, such as the operations associated with display, telephone calls, data communications, camera operations, and recording operations. The processing component 902 may include one or more processors 920 to execute instructions to perform all or part of the actions in the above described methods. Moreover, the processing component 902 may include one or more modules which facilitate the interaction between the processing component 902 and other components. For instance, the processing component 902 may include a multimedia module to facilitate the interaction between the multimedia component 908 and the processing component 902.

The memory 904 is configured to store various types of data to support the operation of the device 900. Examples of such data include instructions for any applications or methods operated on the device 900, contact data, phonebook data, messages, pictures, video, etc. The memory 904 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 906 may provide power to various components of the device 900. The power component 906 may include a power management system, one or more power sources, and any other components associated with the generation, management, and distribution of power in the device.

The multimedia component 908 includes a screen providing an output interface between the device 900 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 908 includes a front camera and/or a rear camera. The front camera and the rear camera may receive an external multimedia datum while the device 900 is in an operation mode, such as a photographing mode or a video mode. Each of the front camera and the rear camera may be a fixed optical lens system or have focus and optical zoom capability.

The audio component 910 is configured to output and/or input audio signals. For example, the audio component 910 includes a microphone ("MIC") configured to receive an external audio signal when the device 900 is in an operation mode, such as a call mode, a recording mode, and a voice recognition mode. The received audio signal may be further stored in the memory 904 or transmitted via the communication component 916. In some embodiments, the audio component 910 further includes a speaker to output audio signals.

The I/O interface 912 provides an interface between the processing component 902 and peripheral interface modules, such as a keyboard, a click wheel, buttons, and the like. The buttons may include, but are not limited to, a home button, a volume button, a starting button, and a locking button.

The sensor component 914 includes one or more sensors to provide status assessments of various aspects of the device 900. For instance, the sensor component 914 may detect an open/closed status of the device 900, relative positioning of components, e.g., the display and the keypad, of the device 900, a change in position of the device 900 or a component of the device 900, a presence or absence of user contact with the device 900, an orientation or an acceleration/deceleration of the device 900, and a change in temperature of the device 900. The sensor component 914 may include a proximity sensor configured to detect the presence of nearby objects without any physical contact. The sensor component 914 may also include a light sensor, such as a CMOS or CCD image sensor, for use in imaging applications. In some embodiments, the sensor component 914 may also include an accelerometer sensor, a gyroscope sensor, a magnetic sensor, a pressure sensor, or a temperature sensor.

The communication component 916 is configured to facilitate communication, wired or wirelessly, between the device 900 and other devices. The device 900 can access a wireless network based on a communication standard, such as Wi-Fi, 2G (2nd-Generation Mobile Communication Technology), or 3G (3rd-Generation Mobile Communication Technology), 4G LTE (Long Term Evolution), 5G (5th-Generation Mobile Communication Technology) NR (New Radio) or a combination thereof. In an exemplary embodiment, the communication component 916 receives a broadcast signal or broadcast associated information from an external broadcast management system via a broadcast channel. In an exemplary embodiment, the communication component 916 further includes a near field communication (NFC) module to facilitate short-range communications. For example, the NFC module may be implemented based on a radio frequency identity (RFID) technology, an infrared data association (IrDA) technology, an ultra-wideband (UWB) technology, a Bluetooth (BT) technology, and other technologies.

In exemplary embodiments, the device 900 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as included in the memory 904, executable by the processor 920 in the device 900, for performing the above-described methods. For example, the non-transitory computer-readable storage medium may be a ROM, a RAM, a CD-ROM, a magnetic tape, a floppy disc, an optical data storage device, and the like.

Those skilled in the art easily think of other embodiments of the disclosure after considering the description and practicing the disclosure disclosed herein. This disclosure is intended to cover any variations, uses, or adaptive changes that follow the general principles of this disclosure and include common general knowledge or customary technical means in the technical field not disclosed in this disclosure. The description and examples are to be considered exemplary only, and the true scope and spirit of this disclosure are disclosed by the claims.

It should be understood that the disclosure is not limited to the precise structure that has been described above and shown in the drawings, and various modifications and changes can be made without departing from the scope thereof. The scope of the disclosure is limited only by the appended claims.

It should be noted that the relational terms herein, such as "first" and "second", are used only for differentiating one entity or operation, from another entity or operation, which, however do not necessarily require or imply that there should be any real relationship or sequence. Moreover, the terms "comprise", "include" or any other variations thereof are meant to cover non-exclusive including, so that the process, method, article or device comprising a series of elements do not only comprise those elements, but also comprise other elements that are not explicitly listed or also comprise the inherent elements of the process, method, article or device. In the case that there are no more restrictions, an element qualified by the statement "comprises a . . . " does not exclude the presence of additional identical elements in the process, method, article or device that comprises the said element.

The method and apparatus provided by the embodiments of the disclosure are described in detail. Specific examples are used herein to illustrate the principles and implementations of the disclosure. The description of the above embodiments is only used to help understand the method and its core idea of the disclosure. Meanwhile, for those skilled in the art, according to the idea of the disclosure, there will be changes in the specific implementation and the scope of the disclosure. In conclusion, the content of the disclosure should not be construed as reference limitation of the disclosure.

What is claimed is:

1. A paging response method, for a terminal configured to connect to at least two operator networks, comprising:
   determining information indicating a first priority for communicating with a first operator network in the at least two operator networks in response to a connection state with the first operator network;
   acquiring information indicating a second priority for communication between a second operator network in the at least two operator networks and the terminal from a paging message in response to receiving the paging message from the second operator network;
   determining whether the first priority is higher than the second priority based on the information indicating the first priority and the information indicating the second priority;

determining to maintain the connection state with the first operator network in response to the first priority being higher than or equal to the second priority; and determining to disconnect from the first operator network and to respond to the paging message of the second operator network, in response to the first priority being smaller than the second priority;

wherein the information indicating the first priority is in a first type, the information indicating the second priority is in a second type, determining whether the first priority is higher than the second priority comprises:

converting the first type of the information indicating the first priority to the second type based on a relationship table between the first type of information indicating the priority and the second type of information indicating the priority; and determining whether the first priority is higher than the second priority based on the information indicating the first priority in the second type and the information indicating the second priority in the second type.

2. The method as claimed in claim 1, wherein, determining to maintain the connection state with the first operator network, or to disconnect from the first operator network and to respond to the paging message of the second operator network, based on the information indicating the first priority and the information indicating the second priority, comprises:

determining whether the first priority is higher than the second priority based on a value of the information indicating the first priority and a value of the information indicating the second priority;

maintaining the connection state with the first operator network in response that the first priority is higher than the second priority; and disconnect from the first operator network, and responding to the paging message of the second operator network, in response that the second priority is higher than the first priority.

3. The method as claimed in claim 2, wherein, determining to maintain the connection state with the first operator network, or to disconnect from the first operator network and to respond to the paging message of the second operator network, based on the information indicating the first priority and the information indicating the second priority, further comprises:

maintaining the connection state with the first operator network in response that the first priority is equal to the second priority.

4. The method as claimed in claim 2, wherein, determining whether the first priority is higher than the second priority based on the value of the information indicating the first priority and the value of the information indicating the second priority, comprises:

determining whether the first priority is higher than the second priority based on the value of the information indicating the first priority and the value of the information indicating the second priority in response that a type of the information indicating the first priority is same with a type of the information indicating the second priority; and determining whether the first priority is higher than the second priority based on the value of the information indicating the first priority and the value of the information indicating the second priority after converting the information indicating the first priority and the information indicating the second priority to the same type, in response that the type of the information indicating the first priority is different from the type of the information indicating the second priority.

5. The method as claimed in claim 1, wherein, the information indicating the first priority comprises n types of sub-information, and determining the information indicating the first priority for communicating with the first operator network, comprises:

setting a weight for each type of sub-information, wherein, a weight for an $i^{th}$ type of sub-information is $x_i$, i≤n, i and n are integers;

determining a value of each type of sub-information, wherein, a value of the $i^{th}$ type of sub-information is $p_i$; and weighting and summing each type of sub-information to determine information A on the first priority:

$$A = \sum_{i=1}^{i=n} x_i p_i.$$

6. The method as claimed in claim 1, wherein, the information indicating the second priority comprises m types of sub-information, and acquiring the information indicating the second priority for communication between the second operator network and the terminal from the paging message, comprises:

acquiring each type of sub-information from the paging message;

setting a weight for each type of sub-information, wherein, a weight for a $j^{th}$ type of sub-information is $y_j$, j≤m, j and m are integers;

determining a value of each type of sub-information, wherein, a value of the $j^{th}$ type of sub-information is $q_j$; and weighting and summing each type of sub-information to determine information B on the second priority:

$$B = \sum_{j=1}^{j=m} y_j q_j.$$

7. The method as claimed in claim 1, wherein, the information indicating the first priority comprises at least one of:

type of service (ToS), quality of service (QOS), and quality of service class identifier (QCI); and/or the information indicating the second priority comprises at least one of:

ToS, QOS, QCI, and reason of paging the terminal.

8. A non-transitory computer-readable storage medium having stored therein computer programs that, when executed by a processor, action in the method as claimed in claim 1 are performed.

9. A paging method, for a second operator network, comprising:

generating a paging message based on information indicating a second priority for communicating with a terminal; and transmitting the paging message to the terminal, wherein, the paging message comprises the information indicating the second priority, wherein the information indicating the second priority is in a second type, and information indicating a first priority for the terminal to communicate with a first operator network is in a first type, the first type of the information indicating the first priority is converted to the second type based on a relationship table between the first type of information indicating the priority and the second type of information indicating the priority, and the terminal determines whether the first priority is higher than the second priority based on the information indicating the first priority in the second type and the information indicating the second priority in the second type.

10. The method as claimed in claim 9, wherein, the information indicating the priority comprises at least one of: type of service (ToS), quality of service (QOS), quality of service class identifier (QCI), and reason of paging the terminal.

11. An electronic device, comprising:
a processor; and
a memory configured to store instructions executable by the processor;
wherein, the processor is configured to perform the method as claimed in claim 9.

12. A non-transitory computer-readable storage medium having stored therein computer programs that, when executed by a processor, action in the method as claimed in claim 9 are performed.

13. An electronic device, comprising:
a processor; and
a memory configured to store instructions executable by the processor;
wherein the processor is configured to:
determine information indicating a first priority for communicating with a first operator network in at least two operator networks in response to a connection state with the first operator network;
acquire information indicating a second priority for communication between a second operator network in the at least two operator networks and the electronic device from a paging message in response to receiving the paging message from the second operator network;
determine whether the first priority is higher than the second priority based on the information indicating the first priority and the information indicating the second priority;
determine to maintain the connection state with the first operator network in response to the first priority being higher than or equal to the second priority; and
determining to disconnect from the first operator network and to respond to the paging message of the second operator network, in response to the first priority being smaller than the second priority;
wherein the information indicating the first priority is in a first type, the information indicating the second priority is in a second type, determining whether the first priority is higher than the second priority comprises:
converting the first type of the information indicating the first priority to the second type based on a relationship table between the first type of information indicating the priority and the second type of information indicating the priority; and
determining whether the first priority is higher than the second priority based on the information indicating the first priority in the second type and the information indicating the second priority in the second type.

14. The electronic device as claimed in claim 13, wherein the processor is configured to:
determine whether the first priority is higher than the second priority based on a value of the information indicating the first priority and a value of the information indicating the second priority;
maintain the connection state with the first operator network in response that the first priority is higher than the second priority; and
disconnect from the first operator network, and respond to the paging message of the second operator network, in response that the second priority is higher than the first priority.

15. The electronic device as claimed in claim 14, wherein the processor is configured to:
maintain the connection state with the first operator network in response that the first priority is equal to the second priority.

16. The electronic device as claimed in claim 14, wherein the processor is configured to:
determine whether the first priority is higher than the second priority based on the value of the information indicating the first priority and the value of the information indicating the second priority in response that a type of the information indicating the first priority is same with a type of the information indicating the second priority; and
determine whether the first priority is higher than the second priority based on the value of the information indicating the first priority and the value of the information indicating the second priority after converting the information indicating the first priority and the information indicating the second priority to the same type, in response that the type of the information indicating the first priority is different from the type of the information indicating the second priority.

17. The electronic device as claimed in claim 13, wherein the information indicating the first priority comprises n types of sub-information, and the processor is configured to:
set a weight for each type of sub-information, wherein, a weight for an $i^{th}$ type of sub-information is $x_i$, i≤n, i and n are integers;
determine a value of each type of sub-information, wherein, a value of the $i^{th}$ type of sub-information is $p_i$; and
weight and sum each type of sub-information to determine information A on the first priority:

$$A = \sum_{i=1}^{i=n} x_i p_i.$$

18. The electronic device as claimed in claim 13, wherein the information indicating the second priority comprises m types of sub-information, and the processor is configured to:
acquire each type of sub-information from the paging message;
set a weight for each type of sub-information, wherein, a weight for a $j^{th}$ type of sub-information is $y_j$, j≤m, j and m are integers;
determine a value of each type of sub-information, wherein, a value of the $j^{th}$ type of sub-information is $q_j$; and weight and sum each type of sub-information to determine information B on the second priority:

$$B = \sum_{j=1}^{j=m} y_j q_j.$$

19. The electronic device as claimed in claim 13, wherein, the information indicating the first priority comprises at least one of:
  type of service (ToS), quality of service (QOS), and quality of service class identifier (QCI); and/or
  the information indicating the second priority comprises at least one of:
  ToS, QOS, QCI, and reason of paging the terminal.

* * * * *